US009656651B2

(12) United States Patent
Yang

(10) Patent No.: US 9,656,651 B2
(45) Date of Patent: May 23, 2017

(54) ELECTRONIC BRAKE SYSTEM

(71) Applicant: MANDO CORPORATION, Gyeonggi-do (KR)

(72) Inventor: I-Jin Yang, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/011,249

(22) Filed: Jan. 29, 2016

(65) Prior Publication Data

US 2016/0221560 A1    Aug. 4, 2016

(30) Foreign Application Priority Data

Feb. 3, 2015    (KR) ........................ 10-2015-0016482

(51) Int. Cl.
| | |
|---|---|
| *B60T 8/40* | (2006.01) |
| *B60T 13/68* | (2006.01) |
| *B60T 7/04* | (2006.01) |
| *B60T 13/16* | (2006.01) |
| *B60T 13/66* | (2006.01) |

(52) U.S. Cl.
CPC ............ *B60T 13/686* (2013.01); *B60T 7/042* (2013.01); *B60T 8/4081* (2013.01); *B60T 13/162* (2013.01); *B60T 13/662* (2013.01)

(58) Field of Classification Search
CPC ...... B60T 7/042; B60T 8/4081; B60T 13/142; B60T 13/662; B60T 13/686
USPC ........ 303/10, 11, 113.1–113.5, 114.1, 115.2, 303/116.2, 116.4
See application file for complete search history.

(56) References Cited

U.S. PATENT DOCUMENTS

| | | | | |
|---|---|---|---|---|
| 9,050,949 B2* | 6/2015 | Miyazaki | ................ | B60T 7/042 |
| 2005/0184585 A1* | 8/2005 | Bayer | ........................ | B60T 8/34 |
| | | | | 303/191 |
| 2011/0241419 A1* | 10/2011 | Ohkubo | .................... | B60T 1/10 |
| | | | | 303/9.62 |
| 2012/0091787 A1 | 4/2012 | Nishino et al. | | |
| 2013/0049449 A1* | 2/2013 | Watanabe | ................. | B60T 1/10 |
| | | | | 303/3 |
| 2013/0186083 A1* | 7/2013 | Hatano | ................. | B60T 8/4081 |
| | | | | 60/571 |

(Continued)

FOREIGN PATENT DOCUMENTS

| | | |
|---|---|---|
| JP | 2009-137564 | 6/2009 |
| JP | 2014-61835 | 4/2014 |

(Continued)

OTHER PUBLICATIONS

Office Action dated Oct. 29, 2015 for Korean Patent Application No. 10-2015-0016482.

(Continued)

*Primary Examiner* — Christopher Schwartz
(74) *Attorney, Agent, or Firm* — Ladas & Parry, LLP

(57) ABSTRACT

An electronic brake system may be capable of providing a required hydraulic pressure continuously and constantly as well as a precise pressure control through a gear pump provided in a hydraulic pressure supply device. Also, the electronic brake system may be capable of minimizing a number of valves controlling hydraulic pressure flows to implement a simplified configuration and providing the braking by a pedal effort of a driver even when the brake system is abnormally operated.

12 Claims, 7 Drawing Sheets

(56) References Cited

U.S. PATENT DOCUMENTS

| | | | | |
|---|---|---|---|---|
| 2013/0239567 A1* | 9/2013 | Ohnishi | ............... | B60T 7/042 |
| | | | | 60/545 |
| 2014/0203626 A1* | 7/2014 | Biller | ............... | B60T 8/4081 |
| | | | | 303/10 |
| 2015/0021981 A1* | 1/2015 | Shimada | ............... | B60T 13/146 |
| | | | | 303/121 |
| 2016/0214591 A1* | 7/2016 | Yang | ............... | B60T 13/686 |

FOREIGN PATENT DOCUMENTS

| | | |
|---|---|---|
| KR | 10-2011-0011938 | 2/2011 |
| KR | 10-2013-0104160 | 9/2013 |
| KR | 10-1392840 | 5/2014 |

OTHER PUBLICATIONS

Notice of Allowance dated Mar. 31, 2016 for Korean Patent Application No. 10-2015-0016482 and its English summary provided by Applicant's foreign counsel.

* cited by examiner

ELECTRONIC BRAKE SYSTEM

CROSS-REFERENCE TO RELATED APPLICATION

This application claims the priority to Korean Patent Application No. 10-2015-0016482, filed on Feb. 3, 2015 in the Korean Intellectual Property Office, the disclosure of which is incorporated herein by reference in its entirety.

BACKGROUND

1. Field

Embodiments of the present invention relate to an electronic brake system, and, more particularly, to an electronic brake system capable of simplifying a structure and precisely controlling pressure.

2. Description of the Related Art

A brake system for the braking is necessarily mounted on a vehicle, and in recent years, a variety of systems for providing stronger and more stable braking have been proposed. For example, there are brake systems including an anti-lock brake system (ABS) for preventing a wheel from being slid while braking, a brake traction control system (BTCS) for preventing a driving wheel from being slipped when a vehicle is unintendedly or intendedly accelerated, an electronic stability control system (ESC) for stably maintaining a driving state of a vehicle by combining the ABS with a traction control to a control hydraulic pressure of a brake, and the like.

Such an electronic brake system includes multiple solenoid valves for controlling brake hydraulic pressure delivered to wheel cylinders mounted on wheels of a vehicle, a pair of a low-pressure accumulator and a high-pressure accumulator for temporarily storing oil discharged from the wheel cylinders, a motor and a pump for forced pumping of oil in the low-pressure accumulator, multiple check valves for preventing a backflow of oil, and an electronic control unit (ECU) for controlling the solenoid valves and driving of the motor, and these components are compactly installed in a hydraulic block made of aluminum. Also, a hydraulic pressure supply device is provided and used for delivering pressure to the wheel cylinders by receiving a driver's request for a braking force in the form of an electrical signal from a pedal displacement sensor that measures a displacement of a brake pedal when the driver steps on the brake pedal.

An electronic brake system provided with such a hydraulic pressure supply device is disclosed in U.S. Patent Application Publication No. 2012/0091787. According to the publication, the hydraulic pressure supply device is made to operate a motor depending on a pedal effort of a brake pedal to thereby generate a rotational force of the motor into a linear motion to pressurize a piston.

However, the electronic brake system with such a structure has a problem in that it is difficult to realize a rapid pressure generation and perform a precise control due to a simple structure of the hydraulic pressure supply device in which a pressurized piston must be returned again to the original position in order to be operated when regenerating a pressure or boosting a generated pressure.

Further, for controlling pressure flow according various control modes, the structure with multiple solenoid valves and a fluid path become complicated for sure, and a separate low-pressure accumulator as well as a motor and a pump for operation thereof need to be provided. Consequently, problems of increased weight and size of the system arise that cause degradations in mounting and space utilization as well as increased vibration and noise due to the operations of the motor and the pump.

SUMMARY

Therefore, an electronic brake system according to one embodiment of the present invention is capable of providing a required hydraulic pressure continuously and constantly as well as a precise pressure control through a gear pump provided in a hydraulic pressure supply device.

Also, the electronic brake system according to one embodiment of the present invention is capable of minimizing a number of valves controlling hydraulic pressure flows to implement a simplified configuration and providing the braking by a pedal effort of a driver even when the brake system is abnormally operated.

In accordance with one aspect of the present invention, an electronic brake system, which has a reservoir storing oil, a master cylinder having first and second hydraulic ports and coupled to the reservoir so as to receive the oil, a pedal displacement sensor measuring a displacement of a brake pedal, and a simulation device connected to the master cylinder to provide a reaction force corresponding to a pedal effort of the brake pedal, includes: a hydraulic pressure supply device having a motor configured to be rotated by receiving an electrical signal from the pedal displacement sensor when the brake pedal is operated, a gear pump configured to discharge and suction a hydraulic pressure depending on a rotational force of the motor, and a power transmission unit configured to deliver the rotational force of the motor to the gear pump; a hydraulic control unit having first and second hydraulic circuits configured to receive the hydraulic pressure by a force generated by the hydraulic pressure supply device to control hydraulic pressure flows delivered to wheel cylinders provided on wheels; and an electronic control unit configured to control the motor and valves based on hydraulic pressure information and pedal displacement information, wherein the gear pump is connected to the first hydraulic circuit through a first hydraulic passage and to the second hydraulic circuit through a second hydraulic passage connected to a branch passage that is branched off from the first hydraulic passage, and the electronic brake system further includes a release valve provided on a passage connecting the branch passage with the reservoir and opened to discharge the hydraulic pressure to the reservoir through the first hydraulic passage and the second hydraulic passage, and wherein one end of the gear pump is connected to the reservoir and the other end of the pump is connected to the first hydraulic circuit to provide a common pressure to the first and second hydraulic circuits.

Also, the electronic brake system may further include a first reserving valve provided at a rear (in a direction of the first hydraulic circuit) of a position at which the branch passage of the first hydraulic passage is branched off to control a hydraulic pressure flow between the first hydraulic circuit and the gear pump; and a second reserving valve provided on the second hydraulic passage to control a hydraulic pressure flow between the second hydraulic circuit and the gear pump.

Also, the first and second reserving valves may be provided with a normally closed type solenoid valve that is closed in a normal operating state and is opened when an opening signal is received The second reserving valve may be provided at a rear (in a direction of the second hydraulic circuit) of a position at which the second hydraulic passage is branched off from the branch passage.

Further, the release valve may be provided between the first and second reserving valves and the gear pump.

Furthermore, the release valve may be provided with a normally closed type solenoid valve that is closed in a normal operating state and is opened when an opening signal is received.

Also, the electronic brake system may further include a first backup passage configured to connect the first hydraulic port with the first hydraulic circuit so as to directly provide the oil to the wheel cylinder when the electronic brake system is abnormally operated, a second backup passage configured to connect the second hydraulic port with the second hydraulic circuit, a first cut valve provided on the first backup passage to control an oil flow, and a second cut valve provided on the second backup passage to control an oil flow.

Further, the first and second cut valves may be provided with a normally opened type solenoid valve that is open in a normal operating state and is closed when a closing signal from the electronic control unit is received.

Furthermore, the hydraulic control unit may include inlet valves, each of which is provided on an upstream side of each of the wheel cylinders so as to control the hydraulic pressure flowing into the wheel cylinder installed on each of the wheels.

Also, the hydraulic control unit may further include a plurality of outlet valves configured to independently control hydraulic pressure flows discharged from the wheel cylinders, and each of the outlet valves are connected to the reservoir.

Further, the inlet valves may be provided with a normally opened type solenoid valve that is open in a normal operating state and is closed when a closing signal from the electronic control unit is received.

Furthermore, the outlet valves may be provided with a normally closed type solenoid valve that is closed in a normal operating state and is opened when an opening signal is received.

The electronic brake system according to one embodiment of the present invention is capable of continuously and constantly providing a required hydraulic pressure as well as precisely controlling a pressure to move to a target pressure value when the pressure is generated higher than the target pressure value according to a pedal effort of the brake pedal.

Also, the electronic brake system of the present invention has an advantage capable of minimizing a number of valves controlling hydraulic pressure flows to implement a simplified configuration compared to the conventional brake system. Therefore, a size of a brake system, that is, a modulator block in which valves are installed may be reduced to realize a low manufacturing cost.

Further, the electronic brake system of the present invention has an effect of a capability of interlocking and controlling the motor with the valves to implement a precise pressure control. In addition, the electronic brake system of the present invention has another advantage of a capability of configuring and independently controlling two hydraulic circuits each of which is connected two wheels and performing an interlock control on the hydraulic pressure supply device depending on a pressure required to each wheel and a priority determination logic, thereby increasing a control range.

Furthermore, according to the present invention, when the brake system fails, the pedal effort of the driver is directly delivered to the master cylinder to perform the braking of a vehicle, thereby stably providing the braking force.

BRIEF DESCRIPTION OF THE DRAWINGS

Although the present invention will be described in detail by the following drawings, these drawings show preferred embodiments of the present invention, and therefore the spirit of the present invention should not be construed as limited to the drawings.

DETAILED DESCRIPTION

Hereinafter, embodiments of the present invention will be described in detail with reference to the accompanying drawings. Exemplary embodiments described herein are provided in order to fully provide the spirit of the invention to those skilled in the art. Therefore, numerous variations and/or modification may be made to the present invention as described in the embodiments without departing from the spirit or scope of the invention. In the accompanying drawings illustrating the embodiments of the present disclosure, the size, height, thickness, and the like of a component may be somewhat exaggerated for ease of understanding and a convenience of description, that is, a component illustrated in a drawing may be reduced, or another component therein may be expanded.

Figure 1:
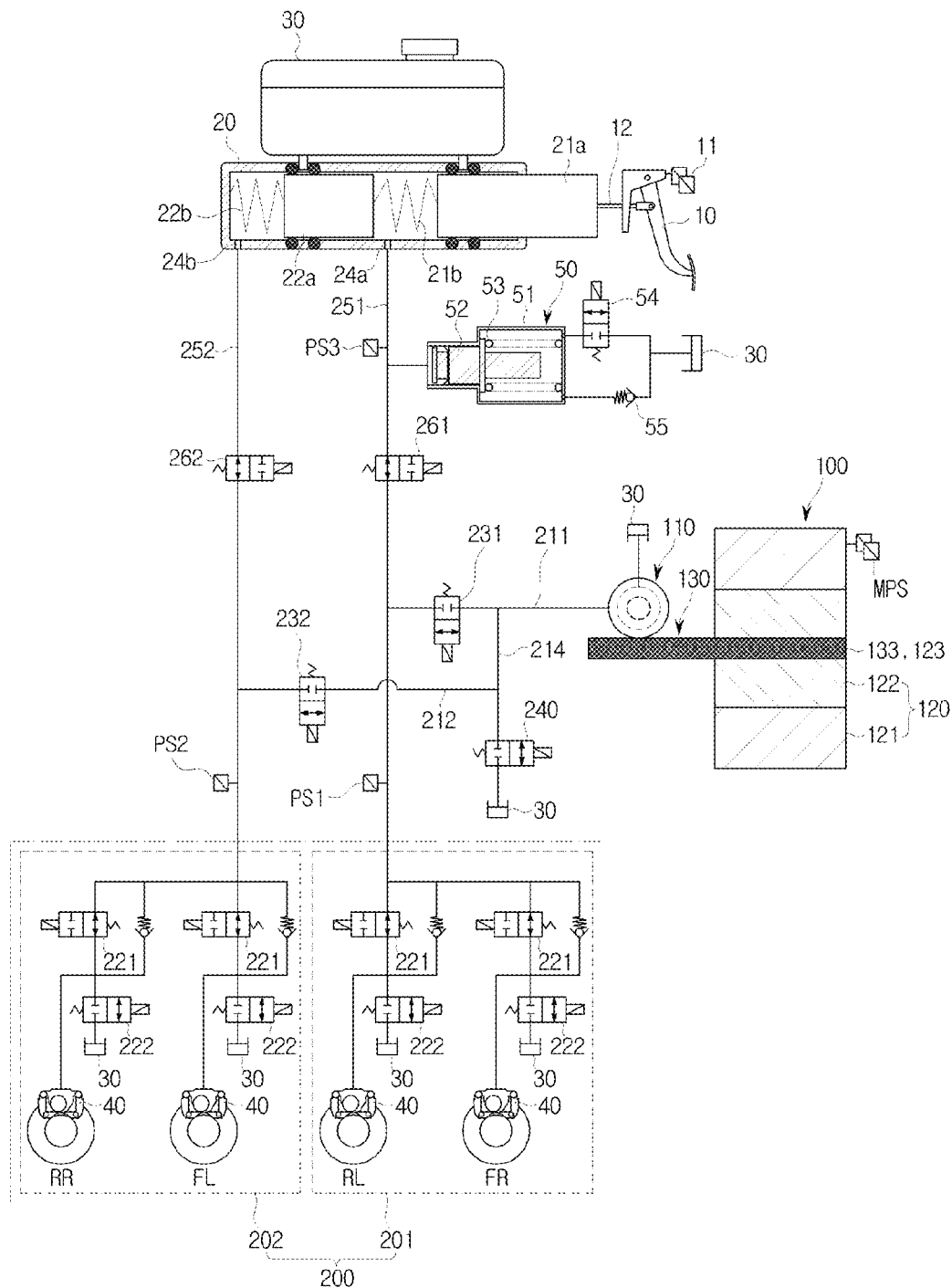
FIG. 1 is a hydraulic circuit diagram illustrating a non-braking state of an electronic brake system according to one preferred embodiment of the present invention.

FIG. 1 is a hydraulic circuit diagram illustrating a non-braking state of an electronic brake system according to one preferred embodiment of the present invention.

With reference to FIG. 1, an electronic brake system is generally equipped with a master cylinder 20 generating a hydraulic pressure, a reservoir 30 coupled to an upper side of the master cylinder 20 to store oil, an input rod 12 pressurizing the master cylinder 20 depending on a pedal effort of a brake pedal 10, a wheel cylinder 40 receiving a hydraulic pressure to perform a braking operation on each wheel RR, RL, FR, and FL, a pedal displacement sensor 11 measuring a displacement of the brake pedal 10, and a simulation device 50 providing a reaction force depending on the pedal effort of the brake pedal 10.

At this point, the master cylinder 20 may be provided with at least one chamber to generate a hydraulic pressure, but, according to the drawing, it is provided with a first piston 21*a* and a second piston 22*a* formed therein in order to have two chambers, and the first piston 21*a* is in contact with the input rod 12. The reason that the master cylinder 20 has the two chambers is for securing the safety during a failure. For example, one of the two chambers is connected to the front right wheel FR and the rear left wheel RL, and the remaining chamber is connected to the front left wheel FL and the rear right wheel RR. On the contrary, one of the two chambers may be connected to two front right and left wheels FR and FL, and the remaining chamber may be connected to two rear right and left wheels RR and RL. As such, configuring the two chambers independently is for enabling braking a vehicle even when one of the two chambers fails. In the master cylinder 20, first and second hydraulic ports 24*a* and 24*b* from which hydraulic pressure from the two chambers is discharged are formed.

Also, a first spring 21*b* is disposed between the first piston 21*a* and the second piston 22*a* of the master cylinder 20, and a second spring 22*b* is provided between the second piston 22*a* and an end of the master cylinder 20. That is, the first spring 21*b* and the second spring 22*b* are provided in each of the two chambers, so that an elastic force is stored as the first piston 21*a* and the second piston 22*a* are compressed. The elastic force pushes the first and second pistons 21*a* and 22*a* to restore to original positions when a force pushing the first piston 21*a* is less than the elastic force.

Meanwhile, the input rod 12 pressurizing the first piston 21*a* of the master cylinder 20 is in a tight contact with the first piston 21*a*, so that there is no gap between the master cylinder 20 and the input rod 12. That is, when the brake pedal 10 is stepped on, the master cylinder 20 is directly pressurized without a pedal dead stroke section.

The simulation device 50 for providing the reaction force depending on the pedal effort of the brake pedal 10 is connected to a first backup passage 251 to be described. As shown in the drawing, the simulation device 50 includes a simulation chamber 51 provided for storing oil discharged from the first hydraulic port 24*a* of the master cylinder 20, a reaction force piston 52 provided in the simulation chamber 51, a pedal simulator equipped with a reaction force spring 53 elastically supporting the reaction force piston 52, and a simulation valve 54 connected to a rear end of the simulation chamber 51. At this point, the simulation chamber 51 is installed to have a predetermined range of displacement according to oil flowing thereinto by the reaction force piston 52 and the reaction force spring 53.

The simulation valve 54 is made to connect the back end of the simulation chamber 51 to the reservoir 30. That is, an inlet of the simulation chamber 51 is connected to the master cylinder 20, the rear end of the simulation chamber 51 is connected to the simulation valve 54, and the simulation valve 54 is connected to the reservoir 30, so that the pedal simulator, i.e., an inside of the simulation chamber 51 is totally filled with oil.

The simulation valve 54 is provided with a normally closed type solenoid valve maintaining a closed state usually, so that it is opened when a driver steps on the brake pedal 10 to deliver brake oil to the simulation chamber 51.

Also, a simulation check valve 55 is installed in parallel with the simulation valve 54. The simulation check valve 55 is made to direct oil flow from the reservoir 30 to the simulation chamber 51. That is, the reaction force piston 52 of the pedal simulator compresses the reaction force spring 53, so that the oil in the simulation chamber 51 is delivered to the reservoir 30 through the simulation valve 54. As a result, since it is in a state where the oil is filled in the simulation chamber 51, friction of the reaction force piston 52 is minimized when the simulation device 50 is operated, so that the durability of the simulation device 50 is improved as well as realizing a structure that blocks ingress of foreign materials from the outside.

Furthermore, when the pedal effort of the brake pedal 10 is released, the oil is provided to the simulation chamber 51 through the simulation check valve 55, so that a rapid return of pressure of the pedal simulator is assured.

The electronic brake system according to the present invention includes a mechanically operated hydraulic pressure supply device 100 receiving a driver's request for braking force in the form of an electrical signal from the pedal displacement sensor 11 measuring a displacement of the brake pedal 10, a hydraulic control unit 200 configured with first and second hydraulic circuits 201 and 202, each of which is equipped with two wheels controlling a hydraulic pressure flow delivered to the wheel cylinder 40 that is provided on each wheel RR, RL, FR, and FL, a first cut valve 261 provided on the first backup passage 251 connecting the first hydraulic port 24*a* to the first hydraulic circuit 201 to control a hydraulic pressure flow, a second cut valve 262 provided on the second backup passage 252 connecting the second hydraulic port 24*b* to the second hydraulic circuit 202 to control a hydraulic pressure flow, and an electronic control unit (not shown) controlling the hydraulic pressure supply device 100 and valves 54, 221, 222, 231, 232, 240, 261, and 262 based on hydraulic pressure information and pedal displacement information.

The hydraulic pressure supply device 100 is equipped with a motor 120 generating a rotational force according to an electrical signal of the pedal displacement sensor 11, a gear pump 110 discharging or suctioning the hydraulic pressure according to the rotational force of the motor 120, and a power transmission unit 130 delivering the rotational force of the motor 120 to the gear pump 110.

Motor 120 is an electric motor generating the rotational force according to a signal output from the electronic control unit (not shown) and is equipped with a stator 121, a rotor 122, and a rotating shaft 123 coupled with the rotor 122 to generate the rotational force in a forward or backward direction under the control of the electronic control unit. Since the motor 120 is generally known in the art, a detailed description thereof will be omitted.

Figure 2:
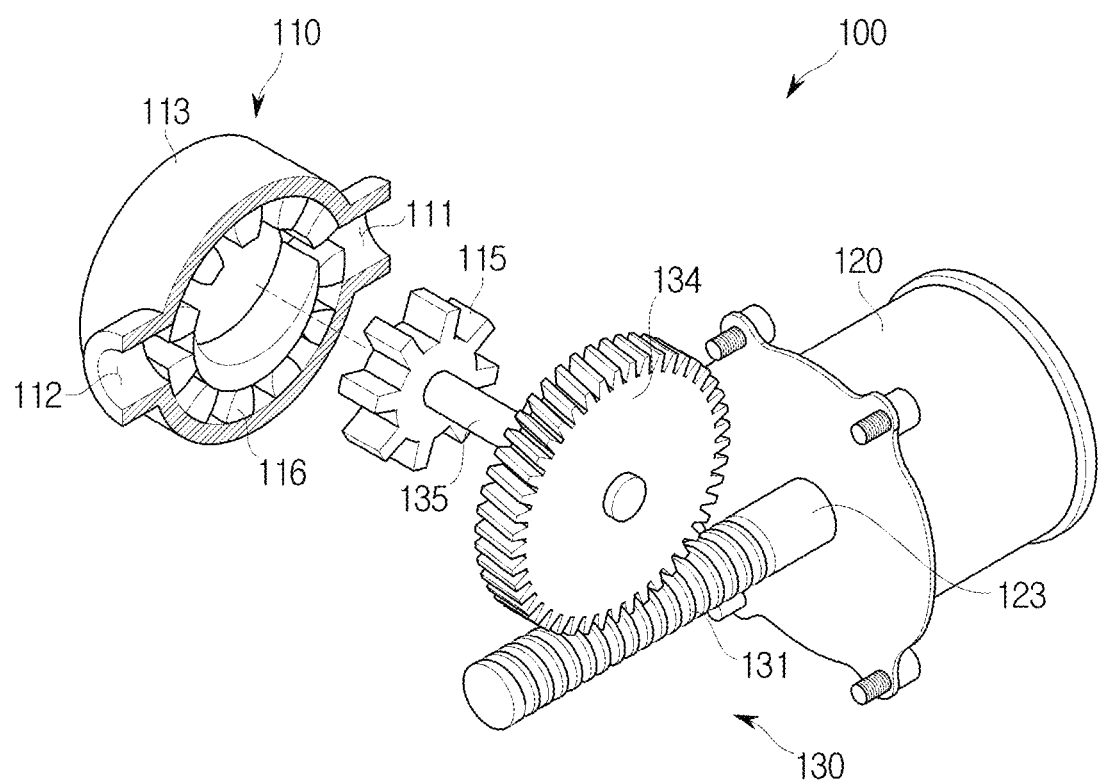
FIG. 2 is a perspective view illustrating a selected portion of a hydraulic pressure supply device provided in the electronic brake system according to one preferred embodiment of the present invention.
Figure 3:
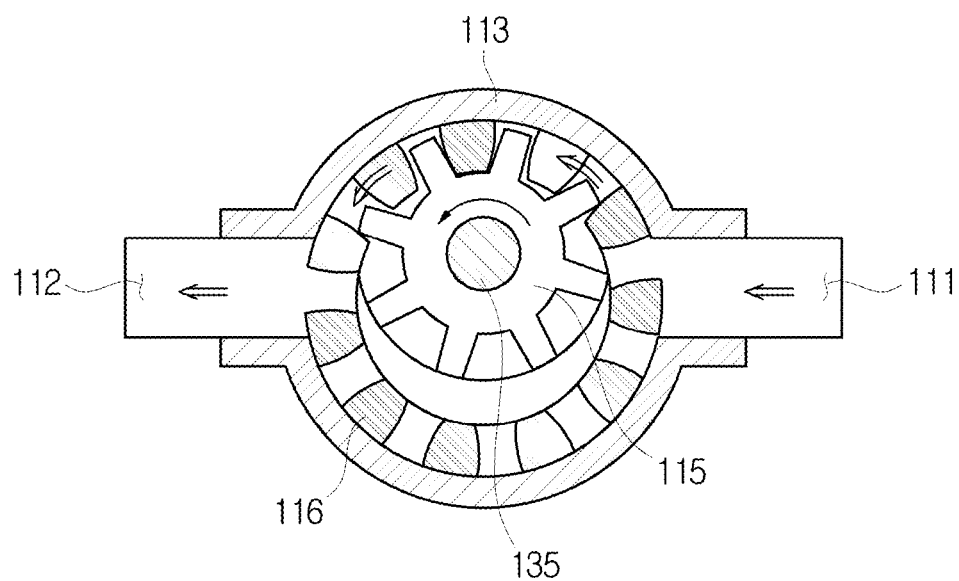
FIG. 3 is a cross-sectional view illustrating an operation state of a gear pump provided in the hydraulic pressure supply device of FIG. 2.

The gear pump 110 is connected to each of the hydraulic circuits 201 and 202 of the hydraulic control unit 200 to be described in later to discharge or suction the hydraulic pressure to and from each of the hydraulic circuits 201 and 202. That is, the gear pump 110 is made to deliver a common hydraulic pressure to the first hydraulic circuit 201 and the second hydraulic circuit 202. In particular, with reference to FIGS. 2 and 3, the gear pump 110 is equipped with a casing 113 within which an accommodation space is provided, a driving gear 115 disposed in the casing 113 and rotated by receiving the rotational force through the power transmission unit 130, and a driven gear 116 rotated by being engaged with the driving gear 115.

A first port 111 and a second port 112 for suctioning or discharging the hydraulic pressure are provided on the casing 113. The first port 111 is connected to the reservoir 30, and the second port 112 is connected to a first hydraulic passage 211. That is, the first port 111 and the second port 112 suction or discharge the hydraulic pressure depending on the rotational direction of the driving gear 115 and the driven gear 116 which are rotated by the rotational force of the motor 120. For example, when the hydraulic pressure is delivered to the first and second hydraulic circuits 201 and 202, the first port 111 serves as an inlet, and the second port 112 serves as an outlet. Also, when the hydraulic pressure delivered to each hydraulic circuit 201 and 202 is suctioned, the second port 112 serves as the inlet, and the first port 111 serves as the outlet.

As shown, the driving gear 115 and the driven gear 116 provided within the casing 113 have a combination internal gear structure. That is, the driving gear 115 rotated by receiving the rotational force by the power transmission unit 130 is rotated while being engaged with gear teeth provided on an inner side of the driven gear 116. At this point, the oil flowing into the casing 113 is discharged through a spacing and a gap due to a difference in the numbers of gear teeth between the driving gear 115 and the driven gear 116. Therefore, a required amount of fluid may be provided continuously and constantly.

The power transmission unit 130 is formed with the rotating shaft 123 as one unit, and equipped with a worm shaft 133 having a worm 131 formed on an outer circumference thereof, a worm wheel 134 engaged with the worm 131, and a driving shaft 135 coupled to the center of the worm wheel 134.

As shown in the drawing, the worm shaft 133 is formed with the rotating shaft 123 as one unit. That is, the worm shaft 133 is rotated according to the rotation of the rotating shaft 123, so that the worm wheel 134 is rotated by being engaged with the worm 131 by receiving the rotational force. Therefore, the driving shaft 135 installed on the center of the worm wheel 134 is provided on the center of the driving gear 115 of the gear pump 110, so that the driving gear 115 is also rotated together with the rotation of the worm wheel 134.

The hydraulic pressure supply device 100 serves to deliver the hydraulic pressure to the wheel cylinders 40 or to suction and deliver the hydraulic pressure to the reservoir 30 depending on a rotational direction of the rotational force generated by the motor 120.

It has been shown and explained that the gear pump 110 has the internal gear structure but is not limited thereto, and it should be understood that any gear assembly structure including an external gear structure and the like may be used as long as the gear assembly structure is capable of receiving the rotational force to suction or discharge the hydraulic pressure.

Referring back to FIG. 1, the hydraulic control unit 200 is made up of the first hydraulic circuit 201 and the second hydraulic circuit 202, each of which receives the hydraulic pressure to control two wheels. As shown, the front right wheel FR and the rear left wheel RL may be controlled by the first hydraulic circuit 201, and the front left wheel FL and the rear right wheel RR may be controlled by the second hydraulic circuit 202. The wheel cylinder 40 is installed on each wheel FR, FL, RR, and RL to receive the hydraulic pressure, thereby performing a braking operation. That is, the hydraulic control unit 200 receives the hydraulic pressure from the hydraulic pressure supply device 100 through the first hydraulic passage 211 connecting the first hydraulic circuit 201 to the gear pump 110, and a second hydraulic passage 212 connected to the second hydraulic circuit 202. At this point, the second hydraulic passage 212 is connected to a branch passage 214 that is branched off from the first hydraulic passage 211. Therefore, the first and second hydraulic passages 211 and 212 are connected to each other through the branch passage 214 to receive the hydraulic pressure from the gear pump 110, thereby delivering the received hydraulic pressure to the wheel cylinder 40 of each hydraulic circuit 201 and 202. At this point, each hydraulic circuit 201 and 202 is equipped with multiple inlet valves 221 so as to control the hydraulic pressure flow.

Two inlet valves 221 are provided in the first hydraulic circuit 201 to be connected to the first hydraulic passage 211, thereby independently controlling the hydraulic pressure delivered to two wheel cylinders 40. Also, two inlet valves 221 are provided in the second hydraulic circuit 202 to be connected to the second hydraulic passage 212, thereby independently controlling the hydraulic pressure delivered to two wheel cylinders 40. These multiple inlet valves 221 are disposed at an upstream side of each of the wheel cylinders 40 and provided with a normally opened type solenoid valve that is open in a normal operating state and is closed when receiving a closing signal.

Also, for improving a brake release performance, the hydraulic control unit 200 is further equipped with the multiple outlet valves 222 connected to the reservoir 30. Each outlet valve 222 is connected to the wheel cylinder 40 to control a discharging of the hydraulic pressure from the respective wheels RR, RL, FR, and FL. That is, when brake pressure of each wheel RR, RL, FR, and FL is measured to determine that a decompression of the brake is required, the outlet valves 222 are selectively opened to control the brake pressure. The outlet valves 222 are provided with a normally closed type solenoid valve that is closed in a normal operating state and is opened when an opening signal is received.

Meanwhile, according to an aspect of the present invention, the electronic brake system is equipped with a first reserving valve 231 provided on the first hydraulic passage 211 and a second reserving valve 232 provided on the second hydraulic passage 212. The first and second reserving valves 231 and 232 are independently controlled and may be provided with a normally closed type solenoid valve that is closed in a normal operating state and is opened when receiving an opening signal. The first and second reserving valves 231 and 232 are selectively opened and closed depending on the required pressure to control a hydraulic pressure flow being delivered to the wheel cylinders 40. For example, when a hydraulic pressure should be delivered only to the wheel cylinders 40 provided on the first hydraulic circuit 201, the first reserving valve 231 is opened to deliver a hydraulic pressure discharged through the gear pump 110 only to the first hydraulic circuit 201 rather than the second hydraulic circuit 202. Such operation structures of the first and second reserving valves 231 and 232 will be described again in below.

Also, the electronic brake system according to one embodiment of the present invention is further equipped with a release valve 240 that controls a pressure to follow-up a target pressure value when the pressure higher than the target pressure value is generated according to a pedal effort of the brake pedal 10. The release valve 240 is provided on a passage connecting the reservoir 30 to the branch passage 214 that connects two hydraulic circuits 201 and 202 to each other. That is, the release valve 240 is provided between the first and second reserving valves 231 and 232 and the gear pump 110. The release valve 230 is provided with a normally closed type solenoid valve that is closed in a normal operating state and is opened when an opening signal is received.

According to an aspect of the present invention, the first and second backup passages 251 and 252 are provided so as to directly supply the oil from the master cylinder 20 to the wheel cylinders 40 when the electronic brake system operation is abnormal. In particular, the first cut valve 261 for controlling oil flow is provided on the first backup passage 251, and the second cut valve 262 for controlling oil flow is provided on the second backup passage 252. Also, the first backup passage 251 connects the first hydraulic port 24a to the first hydraulic circuit 201, and the second backup passage 252 connects the second hydraulic port 24b to the second hydraulic circuit 202.

The first and second cut valves 261 and 262 are provided with a normally opened type solenoid valve that is open in a normal operating state and is closed when a closing signal is received from the electronic control unit. Operation structures of the first and second cut valves 261 and 262 will be described again below.

Meanwhile, reference numerals, which are not described, i.e., 'PS1' is a first pressure sensor measuring a hydraulic pressure of the first hydraulic circuit 201, 'PS2' is a second pressure sensor measuring a hydraulic pressure of the second hydraulic circuit 202, 'PS3' is a third pressure sensor measuring an oil pressure of the master cylinder 20, and 'MPS' is a motor control sensor controlling a rotational angle or a current of the motor 120.

Hereinafter, an operation of the electronic brake system according to a preferred embodiment of the present invention will be described in detail.

Figure 4:
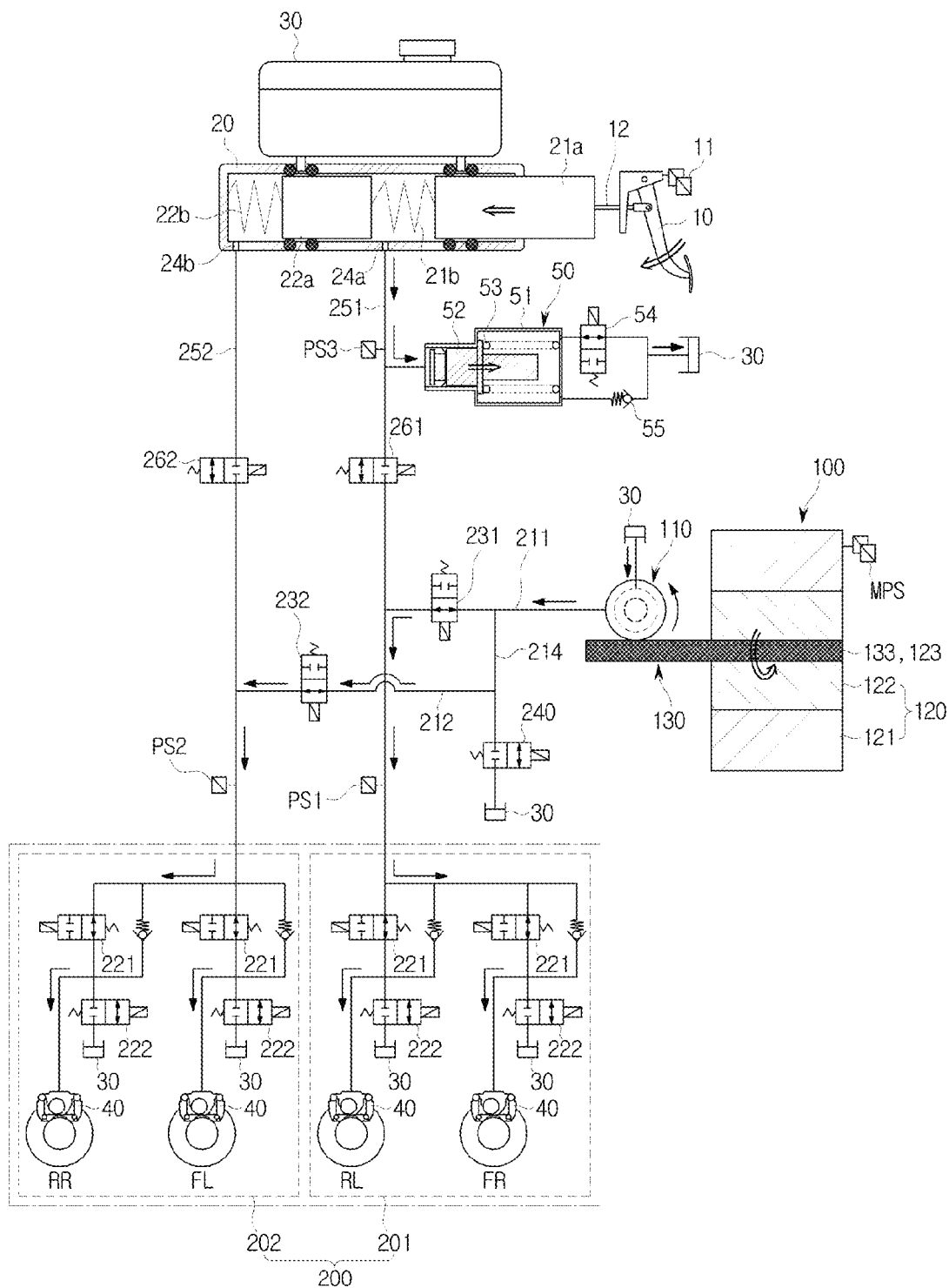
FIG. 4 is a hydraulic circuit diagram illustrating a normal braking operation state of the electronic brake system according to one preferred embodiment of the present invention.

FIG. 4 is a hydraulic circuit diagram illustrating a normal operating state of the electronic brake system.

With reference to FIG. 4, when a driver begins braking, an amount of braking requested by the driver may be based on information including a pressure on the brake pedal 10 put by the driver measured by the pedal displacement sensor 11, etc. The electronic control unit (not shown) receives an electrical signal output from the pedal displacement sensor 11 to operate the motor 120. Also, the electronic control unit may receive an amount of regenerative braking through the third pressure sensor PS3 provided on the outlet of the master cylinder 20 and the first and second pressure sensors PS1 and PS2 provided on the first and second hydraulic circuits 201 and 202 and calculate an amount of friction braking based on a difference between the amount of braking requested by the driver and the amount of regenerative braking, thereby measuring the size of an increase or a reduction in the pressure at the wheel.

In particular, when the driver presses on the brake pedal 10, at the beginning of braking, the motor 120 is operated and a rotational force of the motor 120 is delivered to the gear pump 110 through the power transmission unit 130, so that the oil suctioned from the reservoir 30 through the first port 111 is discharged to the second port 112. That is, the gear pump 110 accommodates the oil in the spacing and the gap between gear teeth of the driving gear 115 rotated together with the worm wheel 134 of the power transmission unit 130 and the driven gear 116 rotated by being engaged with the driving gear 115, thereby directing the oil from the first port 111 to the second port 112. At this point, the oil delivered to the wheel cylinder 40 generates the rotational force of the motor 120 corresponding to a pedal stroke, so that the gear pump 110 may generate the pressure as well as continuously and constantly provide a required flow of the oil.

When a hydraulic pressure is generated using the hydraulic pressure supply device 100, the first and second cut valves 261 and 262 which are installed on the first and second backup passages 251 and 252 connected to the first and second hydraulic ports 24a and 24b of the master cylinder 20 are closed so that the hydraulic pressure generated at the master cylinder 20 is not delivered to the wheel cylinders 40.

Also, the hydraulic pressure generated from the gear pump 110 is delivered to the wheel cylinder 40 installed on each wheel RR, RL, FR, and FL according to the opening of the inlet valves 221 to generate the braking force. At this point, when the pressure delivered to the first and second hydraulic circuits 201 and 202 is measured higher than a target pressure value according to a pedal effort of the brake pedal 10, the release valve 240 is opened to control the pressure to follow-up the target pressure value.

Meanwhile, the pressure generated according to a pressurization of the master cylinder 20 corresponding to the pedal effort of the brake pedal 10 is delivered to the simulation device 50 connected to the master cylinder 20. That is, the simulation valve 54 of a normally closed type arranged on the rear end of the simulation chamber 51 is opened so that the oil filled in the simulation chamber 51 is delivered to the reservoir 30 through the simulation valve 54. Also, the reaction force piston 52 is moved, and a pressure corresponding to a weight of the reaction force spring 53 supporting the reaction force piston 52 is generated in the simulation chamber 51 to provide an appropriate pedal feel to the driver.

Figure 5:
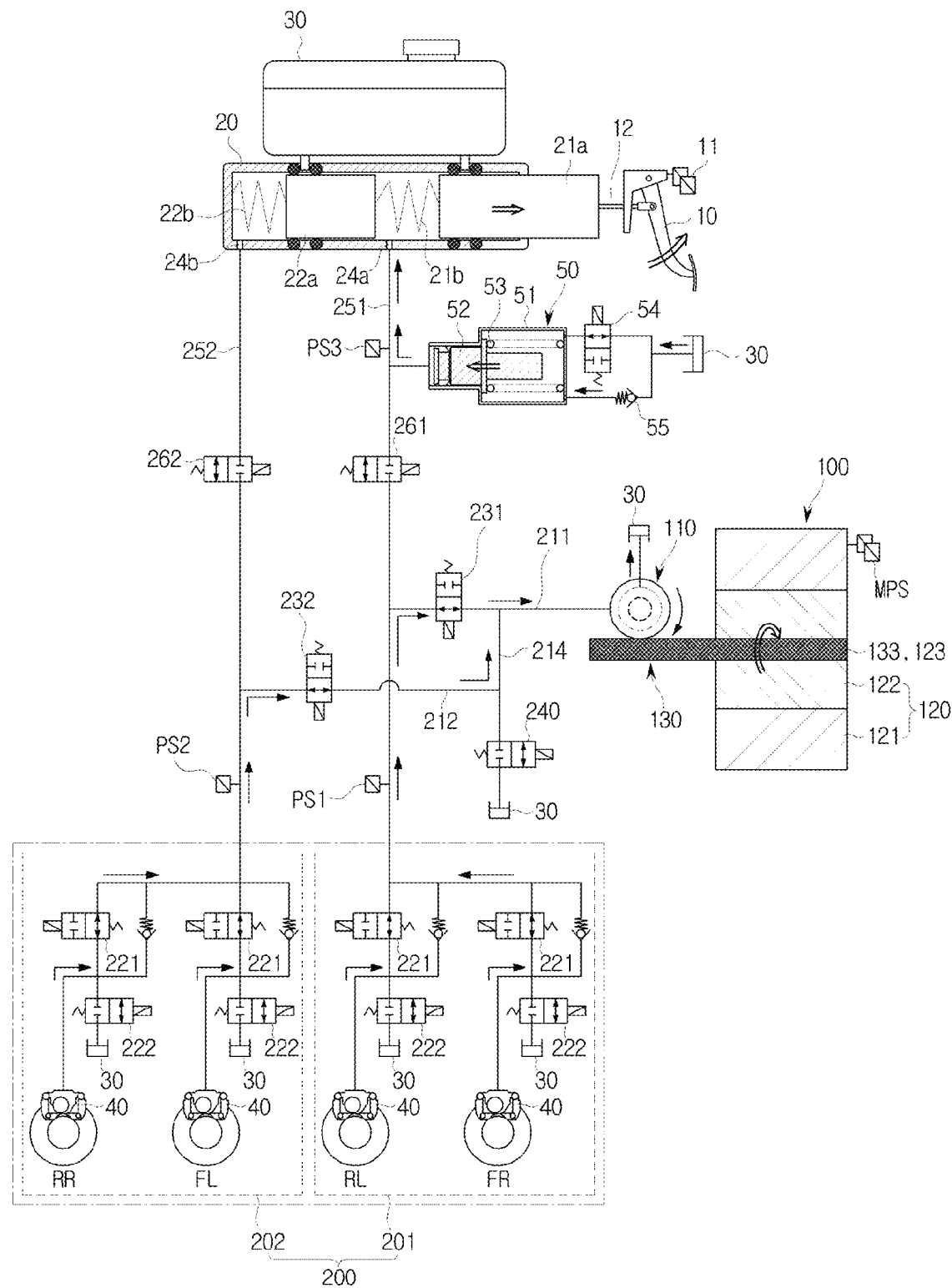
FIG. 5 is a hydraulic circuit diagram illustrating a normal brake releasing operation state of the electronic brake system according to one preferred embodiment of the present invention.

Next, releasing a braking state of the electronic brake system in a normal operating state will be described with reference to FIG. 5. As shown in FIG. 5, when the pedal effort applied to the brake pedal 10 is released, the motor 120 generates a rotational force in a direction opposite to that the braking state to deliver the generated rotational force to the gear pump 110. At this point, the driving gear 115 and the driven gear 116 provided on the gear pump 110 are rotated in a direction opposite to that of the braking state to receive the hydraulic pressure discharged from the wheel cylinders 40 through the first and second hydraulic passages 211 and 212 and deliver the received hydraulic pressure to the reservoir 30. Further, opening and closing operation states of the inlet valves 221, the outlet valves 222, the first and second reserving valves 231 and 232, the release valve 240, the first and second cut valves 261 and 262 are controlled identically as those in the braking state. That is, the outlet valves 222, the release valve 240, and the first and second cut valves 261 and 262 are closed, whereas the inlet valves 221 and the first and second reserving valves 231 and 232 are opened. Therefore, the hydraulic pressure discharged from the wheel cylinders 40 of the first and second hydraulic circuits 201 and 202 is delivered to the reservoir 30 through the gear pump 110 connected to the first and second hydraulic passages 211 and 212.

In the simulation device 50, the oil in the simulation chamber 51 is delivered to the master cylinder 20 according to the return of the reaction force piston 52 to the original position by the reaction force spring 53, and the oil is refilled in the simulation chamber 51 through the simulation valve 54 and the simulation check valve 55 which are connected to the reservoir 30, so that a rapid return of the pedal simulator pressure is assured.

Meanwhile, the electronic brake system according to one embodiment of the present invention may control the valves 54, 221, 222, 231, 232, 240, 261, and 262 provided therein depending on a pressure required by the wheel cylinder 40 provided on each wheel RR, RL, FR, and FL of the two hydraulic circuits 201 and 202 to specify and control a control range. For example, FIG. 6 shows a case where only a corresponding wheel cylinder is braked while the ABS operates, and thus a state of braking only the wheels of the first hydraulic circuit 201 is illustrated.

Figure 6:
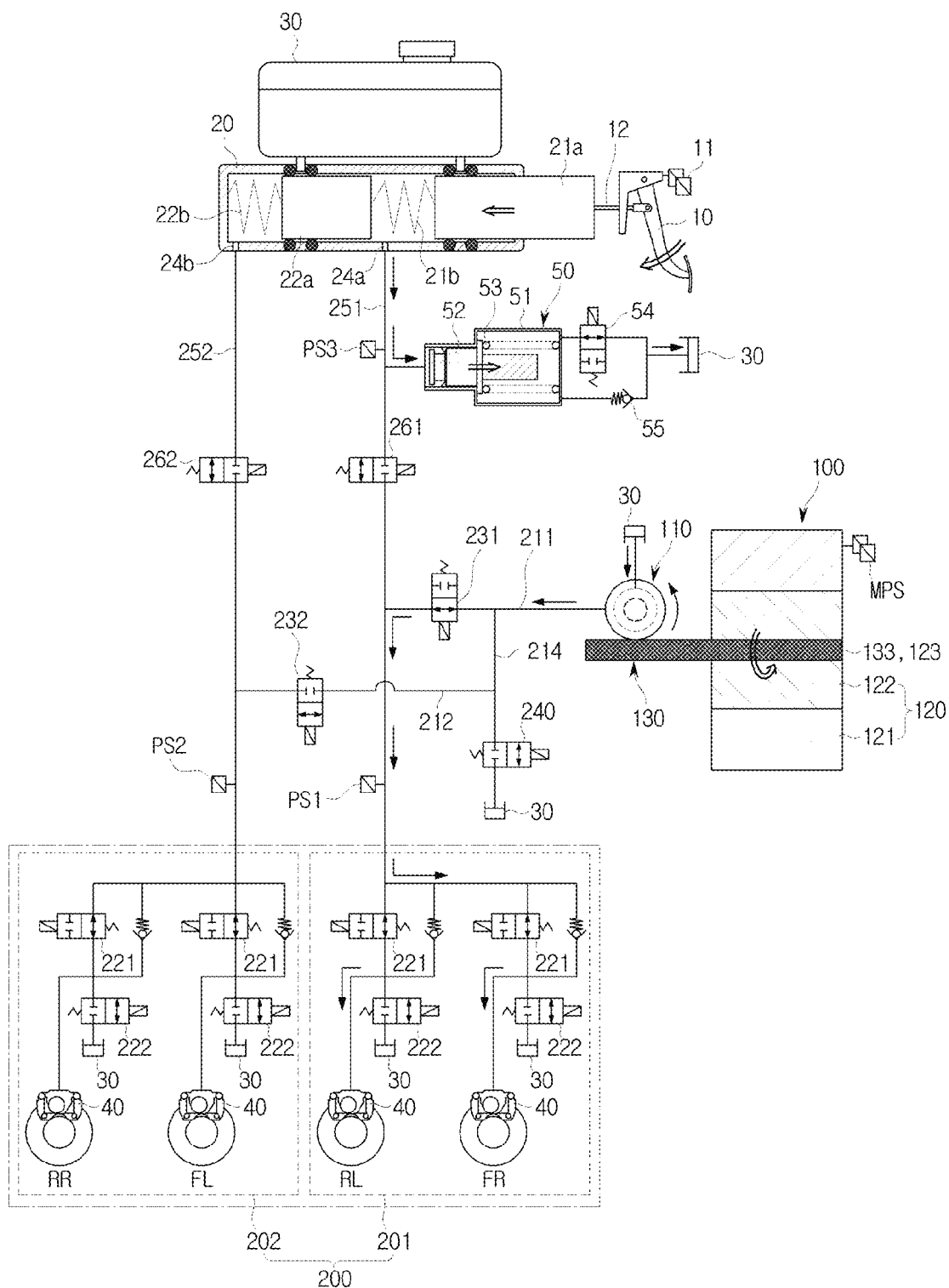
FIG. 6 is a hydraulic circuit diagram illustrating an operation state of an ABS through the electronic brake system according to one preferred embodiment of the present invention.

With reference to FIG. 6, the motor 120 is operated depending on the pedal effort of the brake pedal 10, and a rotational force of the motor 120 is delivered to the gear pump 110 through the power transmission unit 130 to generate a hydraulic pressure. At this point, the first and second cut valves 261 and 262 are closed so that the hydraulic pressure generated at the master cylinder 20 is not delivered to the wheel cylinders 40. Also, only the first reserving valve 231 is opened and the second reserving valve 232 is closed, so the hydraulic pressure discharged from the gear pump 110 is not delivered to the second hydraulic circuit 202. Therefore, the hydraulic pressure discharged from the gear pump 110 is delivered only to the wheel cylinders 40 of the front right wheel FR and the rear left wheel RL which are provided on the first hydraulic circuit 201 through the first hydraulic passage 211.

As such, the structure for controlling the hydraulic pressure delivered to the wheel cylinders 40 through open and close operations of the first and second reserving valves 231 and 232 is one embodiment, and thus it should be understood that the electronic brake system according to the present invention may include a variety of control modules capable of raising or reducing the hydraulic pressure delivered to each wheel RL, RR, FL, and FR by independently opening and closing the inlet valves 221, the outlet valves 222, and the first and second reserving valves 231 and 232. That is, the electronic brake system according to the present invention may independently control the motor 120 and the respective valves 54, 221, 222, 230, 241, and 242 to selectively deliver or discharge the hydraulic pressure to or from the wheel cylinder 40 of each wheel RL, RR, FL, and FR according to a required pressure, thereby a precise control of the pressure possible.

Figure 7:
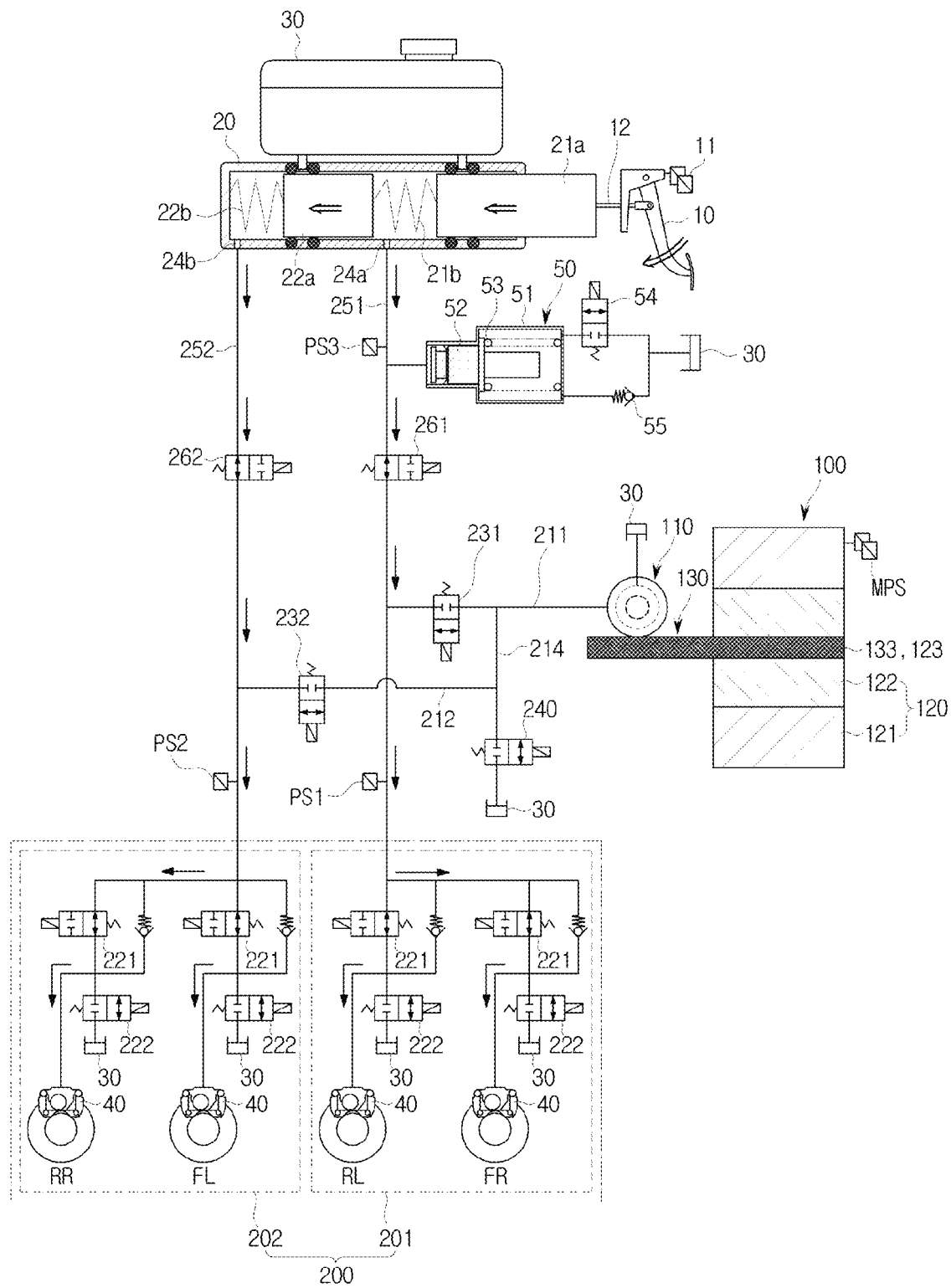
FIG. 7 is a hydraulic circuit diagram illustrating an abnormal operation state of the electronic brake system according to one preferred embodiment of the present invention.

The electronic brake system which is not operated normally will be described. With reference to FIG. 7, when the electronic brake system is not operated normally, the respective valves 54, 221, 222, 231, 232, 240, 261, and 262 are set to the beginning state of braking, that is, a non-operating state. In addition, when the driver pressurizes the brake pedal 10, the input rod 12 connected to the brake pedal 10 is advanced toward a left direction, and simultaneously, the first piston 21a contacted with the input rod 12 is advanced toward the left direction as well as the second piston 22a by the first piston 21a. At this point, since there is no gap between the input rod 12 and the first piston 21a, the braking may be rapidly performed. That is, the hydraulic pressure generated by the pressurized master cylinder 20 is delivered to the wheel cylinders 40 through the first and second backup passages 251 and 252 that are connected for the purpose of backup braking, so that the braking force is realized. At this point, the first and second cut valves 261 and 262 installed on the first and second backup passages 251 and 252 and the inlet valve 221 provided upstream from each wheel RR, RL, FR, and FL are provided with a normally opened type solenoid valve, and the simulation valve 54, the outlet valves 222, the first and second reserving valves 231 and 232, and the release valve 240 are provided with a normally closed type solenoid valve, so that the hydraulic pressure is directly delivered to the wheel cylinders 40. Therefore, the braking is stably realized to improve the safety of braking.

Although a few embodiments of the present invention have been shown and described, but they are not limited thereto, it would be appreciated by those skilled in the art that changes may be made in these embodiments without departing from the principles and spirit of the invention, the scope of which is defined in the claims and their equivalents.

What is claimed is:

1. An electronic brake system, which includes a reservoir storing oil, a master cylinder having first and second hydraulic ports and coupled to the reservoir so as to receive the oil, a pedal displacement sensor measuring a displacement of a brake pedal, and a simulation device connected to the master cylinder to provide a reaction force corresponding to a pedal effort of the brake pedal, comprising:
   a hydraulic pressure supply device having a motor configured to be rotated by receiving an electrical signal from the pedal displacement sensor when the brake pedal is operated, a gear pump configured to discharge and suction a hydraulic pressure depending on a rotational force of the motor, and a power transmission unit configured to deliver the rotational force of the motor to the gear pump;
   a hydraulic control unit having first and second hydraulic circuits configured to receive the hydraulic pressure by a force generated by the hydraulic pressure supply device to control hydraulic pressure flows delivered to wheel cylinders provided on wheels; and
   an electronic control unit configured to control the motor and valves based on hydraulic pressure information and pedal displacement information,
   wherein the gear pump is connected to the first hydraulic circuit through a first hydraulic passage and to the second hydraulic circuit through a second hydraulic passage connected to a branch passage that is branched off from the first hydraulic passage, and
   the electronic brake system further comprising:
   a release valve provided on a passage connecting the branch passage with the reservoir and opened to discharge the hydraulic pressure to the reservoir through the first hydraulic passage and the second hydraulic passage, and
   wherein one end of the gear pump is connected to the reservoir and the other end of the pump is connected to the first hydraulic circuit to provide a common pressure to the first and second hydraulic circuits.

2. The electronic brake system according to claim 1, further comprising:
   a first reserving valve provided at a rear (in a direction of the first hydraulic circuit) of a position at which the branch passage of the first hydraulic passage is branched off to control a hydraulic pressure flow between the first hydraulic circuit and the gear pump; and
   a second reserving valve provided on the second hydraulic passage to control a hydraulic pressure flow between the second hydraulic circuit and the gear pump.

3. The electronic brake system according to claim 2, wherein the first and second reserving valves are made of a normally closed type solenoid valve that is closed in a normal operating state and is opened when an opening signal is received.

4. The electronic brake system according to claim 2, wherein the second reserving valve is provided at a rear (in a direction of the second hydraulic circuit) of a position at which the second hydraulic passage is branched off from the branch passage.

5. The electronic brake system according to claim 2, wherein the release valve is provided between the first and second reserving valves and the gear pump.

6. The electronic brake system according to claim 2, wherein the release valve is provided with a normally closed type solenoid valve that is closed in a normal operating state and is opened when an opening signal is received.

7. The electronic brake system according to claim 1, further comprising:
- a first backup passage configured to connect the first hydraulic port with the first hydraulic circuit so as to directly provide the oil to the wheel cylinder when the electronic brake system is abnormally operated;
- a second backup passage configured to connect the second hydraulic port with the second hydraulic circuit;
- a first cut valve provided on the first backup passage to control an oil flow; and
- a second cut valve provided on the second backup passage to control an oil flow.

8. The electronic brake system according to claim 7, wherein the first and second cut valves are provided with a normally opened type solenoid valve that is open in a normal operating state and is closed when a closing signal from the electronic control unit is received.

9. The electronic brake system according to claim 1, wherein the hydraulic control unit includes inlet valves each of which is provided on an upstream side of each of the wheel cylinders so as to control the hydraulic pressure flowing into the wheel cylinder installed on each of the wheels.

10. The electronic brake system according to claim 9, wherein the hydraulic control unit further includes a plurality of outlet valves configured to independently control hydraulic pressure flows discharged from the wheel cylinders,
wherein each of the outlet valves are connected to the reservoir.

11. The electronic brake system according to claim 9, wherein the inlet valves are provided with a normally opened type solenoid valve that is open in a normal operating state and is closed when a closing signal from the electronic control unit is received.

12. The electronic brake system according to claim 10, wherein the outlet valves are provided with a normally closed type solenoid valve that is closed in a normal operating state and is opened when an opening signal is received.

* * * * *